(12) United States Patent
Briggs et al.

(10) Patent No.: US 10,708,557 B1
(45) Date of Patent: Jul. 7, 2020

(54) MULTISPECTRUM, MULTI-POLARIZATION (MSMP) FILTERING FOR IMPROVED PERCEPTION OF DIFFICULT TO PERCEIVE COLORS

(71) Applicant: Lyft, Inc., San Francisco, CA (US)

(72) Inventors: Forrest Samuel Briggs, Palo Alto, CA (US); Romain Clément, Campbell, CA (US); Yi Zhou, San Jose, CA (US)

(73) Assignee: Lyft Inc., San Francisco, CA (US)

( * ) Notice: Subject to any disclaimer, the term of this patent is extended or adjusted under 35 U.S.C. 154(b) by 0 days.

(21) Appl. No.: 16/221,414

(22) Filed: Dec. 14, 2018

(51) Int. Cl.
| | | |
|---|---|---|
| *H04N 9/04* | (2006.01) | |
| *G02B 5/20* | (2006.01) | |
| *H04N 5/232* | (2006.01) | |
| *G06T 7/70* | (2017.01) | |
| *H04N 13/25* | (2018.01) | |
| *H04N 13/257* | (2018.01) | |
| *H04N 13/239* | (2018.01) | |

(Continued)

(52) U.S. Cl.
CPC ......... *H04N 9/04555* (2018.08); *G02B 5/201* (2013.01); *G06T 7/70* (2017.01); *H04N 5/23229* (2013.01); *H04N 13/239* (2018.05); *H04N 13/25* (2018.05); *H04N 13/257* (2018.05); *G06K 9/00664* (2013.01); *G06N 20/20* (2019.01); *H04N 9/04559* (2018.08); *H04N 2013/0077* (2013.01); *H04N 2013/0081* (2013.01)

(58) Field of Classification Search
CPC .. H04N 5/2258; H04N 13/204; H04N 13/239; H04N 13/25; H04N 13/257; H04N 2013/00–296; H04N 9/04555; H04N 9/04553; H04N 9/04559; H04N 9/04557; H04N 9/04551; H04N 9/0455
See application file for complete search history.

(56) References Cited

U.S. PATENT DOCUMENTS

| | | |
|---|---|---|
| 2008/0046150 A1 | 2/2008 | Breed |
| 2012/0188409 A1* | 7/2012 | Gallagher ............. H04N 9/045 348/239 |

(Continued)

FOREIGN PATENT DOCUMENTS

| | | | |
|---|---|---|---|
| KR | 101831890 B1 | 2/2018 | |
| KR | 20180102331 A | 9/2018 | |
| WO | WO-2017171412 A2 * | 10/2017 | ......... H04N 9/04555 |

OTHER PUBLICATIONS

International Search Report and Written Opinion for International Application No. PCT/US2019/064746. Apr. 8, 2020.

*Primary Examiner* — Paul M Berardesca
(74) *Attorney, Agent, or Firm* — Baker Botts L.L.P.

(57) ABSTRACT

In one embodiment, a method includes accessing first image data generated by a first image sensor having a first filter array that has a first filter pattern. The first filter pattern includes a first filter type corresponding to a spectrum of interest and a second filter type. The method also includes accessing second image data generated by a second image sensor having a second filter array that has a second filter pattern different from the first filter pattern. The second filter pattern includes a number of second filter types, the number of second filter types and the number of first filter types have at least one filter type in common. The method also includes determining a correspondence between one or more first pixels of the first image data and one or more second pixels of the second image data.

20 Claims, 8 Drawing Sheets

(51) Int. Cl.
  *G06N 20/20*   (2019.01)
  *H04N 13/00*   (2018.01)
  *G06K 9/00*    (2006.01)

(56) References Cited

U.S. PATENT DOCUMENTS

| | | |
|---|---|---|
| 2014/0321712 A1 | 10/2014 | Ciurea |
| 2015/0189255 A1* | 7/2015 | Sohn ........................ H04N 5/33 348/47 |
| 2016/0335778 A1 | 11/2016 | Smits |
| 2018/0213170 A1* | 7/2018 | Segawa .................... H04N 9/07 |
| 2020/0077076 A1* | 3/2020 | Xue ...................... H04N 13/239 |

* cited by examiner

US 10,708,557 B1

MULTISPECTRUM, MULTI-POLARIZATION (MSMP) FILTERING FOR IMPROVED PERCEPTION OF DIFFICULT TO PERCEIVE COLORS

BACKGROUND

Optical cameras may include an image sensor that is configured to capture still images or video. As an example and not by way of limitation, the optical cameras may include a charge-coupled device (CCD) image sensor or a complementary metal-oxide-semiconductor (CMOS) active-pixel image sensor. In particular embodiments, the CMOS image sensor may include a filter array. A typical filter array has a mosaic of filters tuned to capture information of particular features of light (e.g., wavelength or polarization).

Multispectral imaging may be used to improve many real-world applications. Example applications may include navigation for autonomous vehicles, robotic applications, or forestry inspection from aerial platforms. As an example and not by way of limitation, successful navigation (e.g., assisted or autonomous) is reliant on timely detection and recognition of obstacles on the roadway, but detecting wavelengths spectrally outside the spectrum of the filter array may be difficult and computationally intensive.

DESCRIPTION OF EXAMPLE EMBODIMENTS

Figure 1:
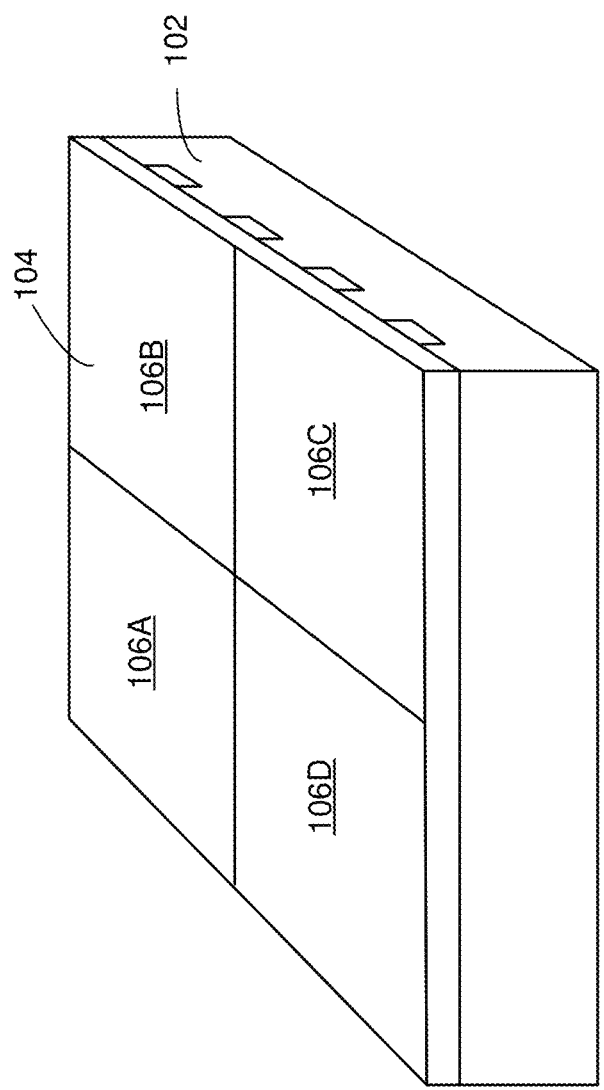
FIG. 1 illustrates a cross-section of an image sensor with an example filter array.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The optical cameras may include a complementary metal-oxide-semiconductor (CMOS) active-pixel image sensor and a filter array. The filter array, described in more detail below, is a mosaic of filters with a feature that is responsive to particular properties of incident light. As an example and not by way of limitation, the filter array may have a combination of features that are responsive to particular wavelengths of the incident light. As another example, a filter array may have a combination of filters that are responsive to the components of incident light having a particular polarization (e.g., 0°, 45°, 90°, 135°, or any suitable polarization). Data captured using different polarization may be used to detect specular reflections, which are common on oily, wet, or ice road surfaces. this may be used, e.g., to estimate road surface friction coefficients from images. Furthermore, polarization may be used to help differentiate pixels corresponding to sky from other pixels. A common failure mode for depth estimation is to incorrectly predict depth for the sky by predicting the sky is not far away from the optical cameras.

As an example and not by way of limitation, raw data captured from the optical cameras may store the unmodified spectrum information of individual photosites, but in many applications, an image signal processor (ISP) may be used to infer the data corresponding to the full set of features of the filter array for each photosite to produce an image at the full resolution. As an example and not by way of limitation, a photosite with a red filter is primarily responsive to portion of incident light corresponding to the range of wavelengths of the spectrum corresponding to the color red, but the ISP may estimate the signal corresponding to the range of wavelengths of the spectrum corresponding to the colors green and blue, based on data from adjacent photosites. As another example, a photosite with for 0° polarization is primarily responsive to portion of incident light corresponding to for 0° polarization, but the ISP may estimate the signal corresponding to 90° polarization data based on data from adjacent photosites. The difficulty in detecting feature outside of the features of the filter may lead to latency in recognizing obstacles having these other features, which in turn may lead to an increased number of interventions to avoid these obstacles. As an example and not by way of limitation, the spectrum corresponding to the color orange (e.g., "safety" orange) may have a relatively low spectral response in many filter arrays which may make it difficult to detect the caution signal of a traffic light or avoid construction work areas (e.g., orange work cones or orange equipment), as described in more detail below.

Herein, reference to a feature refers to a quality associated with light, such as for example spectrum, polarization, or temperature. Furthermore, reference herein to a filter type refers to a particular feature associated with light. As an example and not by way of limitation, a filter type for the spectrum corresponding to the color red or green, or for polarization a vertical or 45° polarizing filter. The mosaic of multiple cameras may include at least one corresponding filter in the mosaic having a feature common with the mosaic at least one other camera. As an example and not by way of limitation, a first filter array may have a combination of a red, green, blue, and visible spectrum filters, and a second filter array may have a combination of red, orange, green, and visible spectrum filters. In particular embodiments, the common or referential filter element may be used to estimate the depth of the pixels from images captured using the respective filter arrays.

Features of incident light outside of the primary response of the particular filter induce a reduced response in the associated photo sites of the sensor, as described in more detail below. By determining depth information of one or more photosites from multiple cameras may be used to determine stereo matching between the cameras based on cost aggregation calculations, especially for scenes with areas that are featureless (e.g., blank walls). In other words, the depth of a particular photosite in one image sensor and the corresponding photosite location in another image sensor may be used to estimate the amount of spatial offset between corresponding photosites capturing the same scene.

Embodiments described herein may benefit a variety of platforms, systems, or methods, especially those where accurate characterization and perception of the surrounding is important, by providing multispectral data and determining particular wavelengths that are traditionally difficult to identify using existing image sensors. As an example and not by way of limitation, the multispectral images generated using the embodiments described herein may improve a vehicle's (e.g. autonomous, semi-autonomous, or traditional manual vehicles) ability to understand its surrounding (e.g., using computer-vision techniques) and make informed decisions accordingly (e.g., improved navigation and driving decisions, hazard avoidance, emergency responses, responses to traffic signs with particular colors, etc.). Similarly, an operator of a manned or unmanned airborne vehicle (UAV) may be able to fly and navigate with improved computer assistance due to the improvements and enrichments to the underlying data on which the computer assistance is based. For example, the UAV may be able to navigate with improved confidence in its ability to detect and classify objects as obstacles (e.g., trees, buildings and birds) and non-obstacles (e.g., clouds). As another example, robotic handling systems may perform more efficiently when the vision system of the robots are able to recognize the various objects to be packaged based on their unique color, multispectral, and/or multi-polarization signature. As another example, automated harvesting (e.g., fruit) may be improved by being able to detect and recognize produce having difficult-to-perceive colors (e.g., orange, purple, pink, etc.). Automated detection of defects of parts on an assembly line may benefit from the use of the multispectral, multi-polarization signature detect defects that may be difficult to detect using visual images alone.

In particular embodiments, a sensor array of a vehicle, described in more detail below, may include multiple cameras that have filter arrays with differing mosaics of features. Herein, reference to a feature refers to a quality associated with light, such as for example spectrum, polarization, or temperature. Furthermore, reference herein to a filter type refers to a particular feature associated with light. As an example and not by way of limitation, a spectrum filter type may include filters corresponding to colors red or green, or for polarization a vertical or 45° polarizing filter. The mosaic of multiple cameras may include at least one corresponding filter in the mosaic having a feature common with the mosaic at least one other camera. In particular embodiments, the common or referential filter element may be used to estimate the depth of the pixels from images captured using the respective filter arrays. By determining the correspondence between photosites of different image sensors capturing the same scene, a multispectral, multi-polarization image including the data captured using differing filter arrays may be generated for object detection. As described in more detail below, a filter array with filters corresponding to a particular color (e.g., orange) may be used in conjunction with a filter array with different spectrum combinations to generate a multispectral image that combines channels of the different spectrum combinations and the particular spectrum.

FIG. 1 illustrates a cross-section of an image sensor with an example filter array. As an example and not by way of limitation, optical cameras that use an image sensor 102 configured to capture still images or video. The optical cameras may include a CCD or CMOS active-pixel image sensor. The optical cameras may be used for recognizing roads, lane markings, street signs, traffic lights, vehicles, people, animals, or other visible objects of interest present in the external environment. Image sensor 102 includes an array of photosites (e.g., photodiode, transfer gate, a floating diffusion, or any suitable photosensitive element) that each produce a signal that is proportional to an amount of incident light. As illustrated in the example of FIG. 1, an image sensor 102 may include a filter array 104 that is located above the top surface of image sensor 102. In particular embodiments, filter array 104 may be below a microlens array (not shown). As illustrated in the example of FIG. 1, a 2×2 filter array 104 may include areas 106A-D that form a pattern or mosaic of features (e.g., a spectrum filter that allows light of a particular range of wavelengths pass through or polarizer allows light of a particular polarization pass through) that each have a particular filter type (e.g., particular range of wavelengths or type of polarization). The channels may provide data of the intensity of light in that particular wavelength, data of different polarizations to calculate the surface normal and depth, or data to calculate the velocity of the pixel. Furthermore, each area 106A-D may include multiple filter types, such as for example, a particular wavelength filter and a particular polarization filter. Each area 106A-D may correspond to a particular photosite of image sensor 102. As illustrated in the example of FIG. 1, area 106A may include a 2×2 subset of areas 106A-D that form a pattern of filters with differing filter types, as described in more detail below. Although this disclosure describes and illustrates filters having patterns of particular dimensions, this disclosure contemplates patterns having any suitable dimensions, such as for example, 4×4, 132×132, or 1080×1080.

Figure 2:
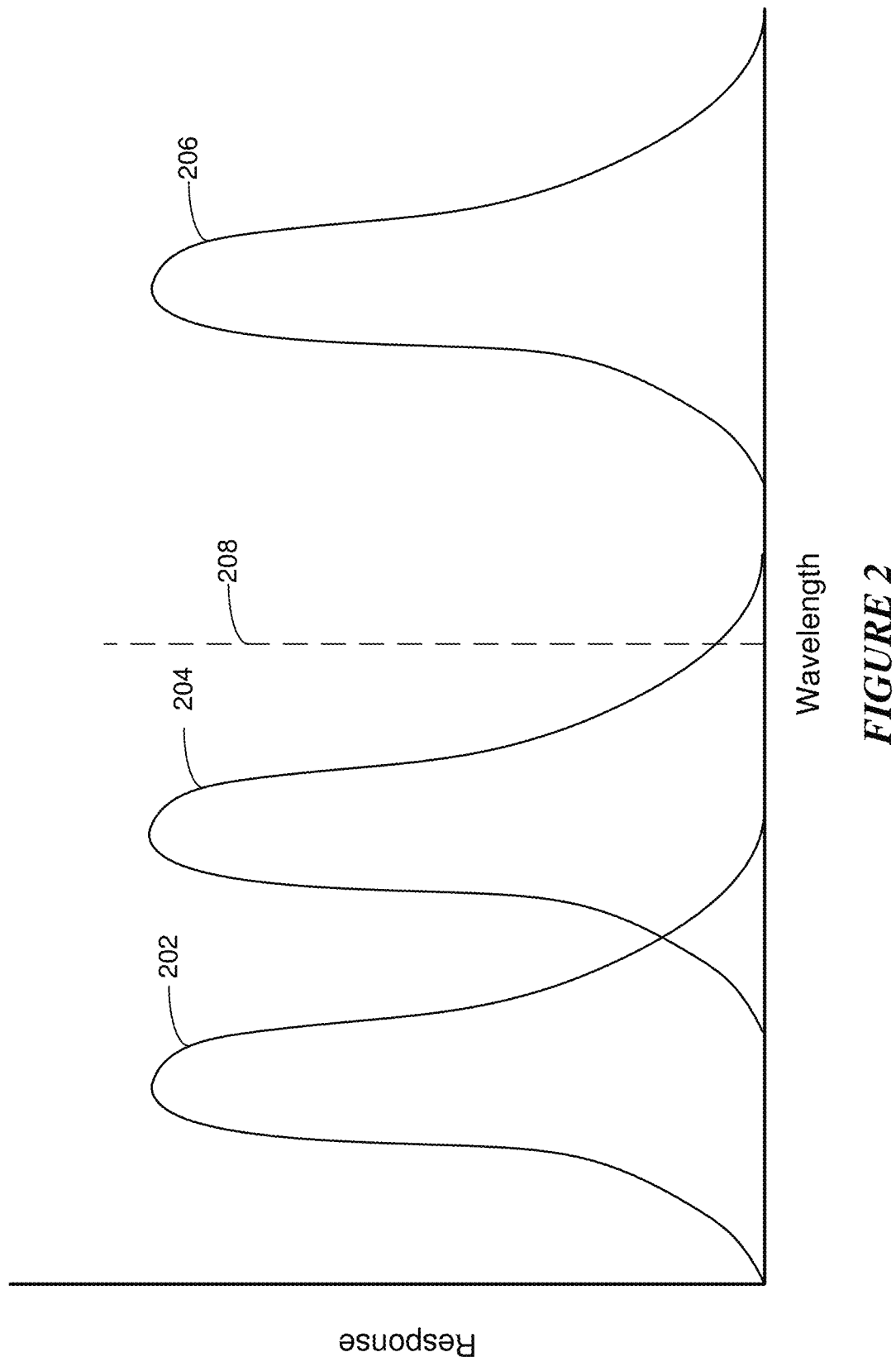
FIG. 2 illustrates a spectral response of an example filter array.

FIG. 2 illustrates a spectral response of an example filter array. In particular embodiments, the filter array may include a mosaic of filters that are responsive to light of a particular range of wavelengths (spectrum or colors), as illustrated in the example of FIG. 2. As an example and not by way of limitation, curves 202, 204, and 206 may correspond to the spectral response of a photosite having a filter corresponding to colors red, green, and blue, respectively. A wavelength 208 may correspond to a range of wavelengths that would have a significantly reduced response to the features of the filter array (e.g., orange).

As described above, the filters of the filter array may be used to identify colors in particular wavelength bands (e.g., corresponding to curve 202). As an example and not by way of limitation, a photosite with a red filter is primarily responsive to portion of incident light corresponding to the range of wavelengths of the color red, as illustrated by curve 202. Objects that have a significant red component (e.g., a red traffic light or car) may be identified based on receiving a strong signal from photosites with a red filter. Similarly, objects that have a significant green component may be identified based on receiving a strong signal from photosites with a green filter. Depending on the particular color filter combination of the filter array, objects corresponding to wavelengths that are not within the response curves of the filters (e.g., construction cones of "safety orange" color) may be hard to identify due to where the wavelength (e.g., line 208) relative to the response of the color filters (e.g., 202-206).

Figure 3:
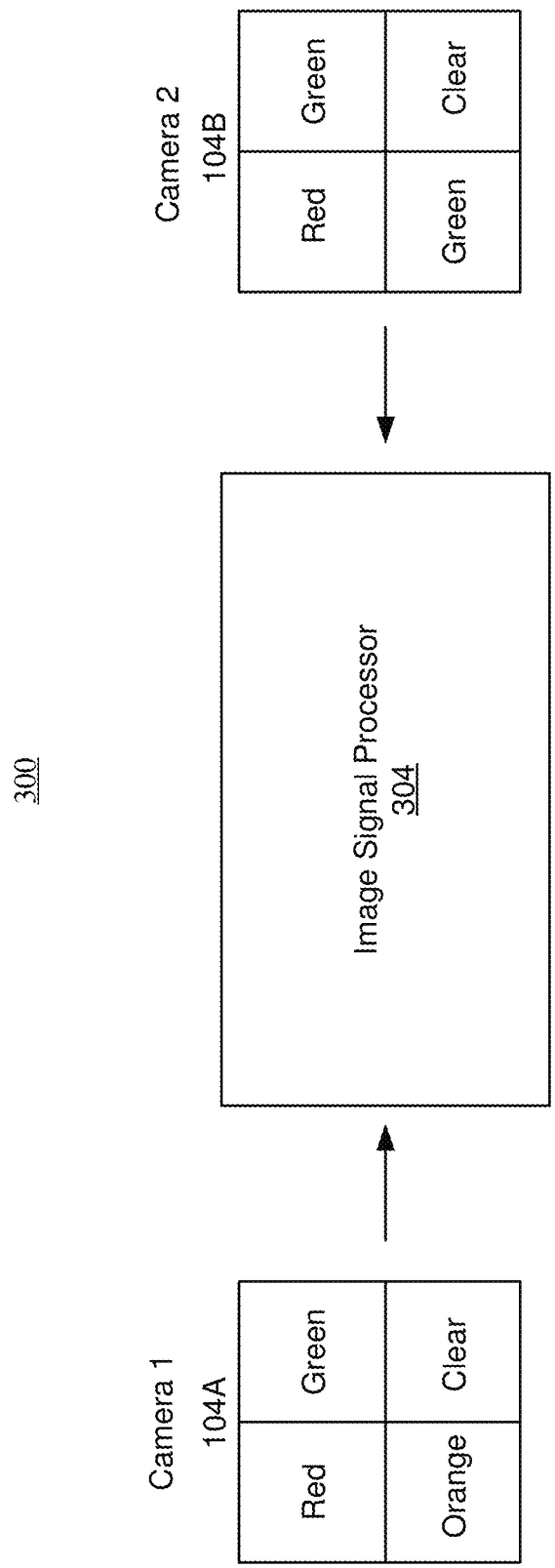
FIG. 3 illustrates a schematic of cameras with a filter array having an example filter-type combination.

FIG. 3 illustrates a schematic of cameras with a filter array having an example filter-type combination. A scene may be reconstructed in three-dimensions (3D) using multiple optical cameras (e.g., Camera 1 and Camera 2) with overlapping fields of view (FOVs) or frustums. Stereo reconstruction is the perception of depth and 3D structure obtained on the basis of information deriving from cameras with overlapping frustums. Because optical cameras are located at different lateral positions, there is a perceived displacement or difference in the apparent position of an object viewed along two different lines of sight due to parallax. The displacement is processed in the visual cortex of the brain to yield depth perception. Due to foreshortening, nearby objects show a larger parallax than farther objects when observed from different positions, so parallax can be used to determine distances.

As an example and not by way of limitation, a camera system 300 may include multiple (e.g., more than 2) optical cameras that have at least partial overlapping frustums. As another example, optical cameras of the vehicle may be organized as pre-determined number (e.g., 6) of pairs with to capture 3D visual data. In particular embodiments, 3D reconstruction of the external environment may be performed using image data from the multispectral, multi-polarization data of the multiple (e.g., more than 2) optical cameras. As illustrated in the example of FIG. 3, a camera system 300 may include multiple cameras, Camera 1 and Camera 2 with at least a partial overlap in FOV or frustum. As an example and not by way of limitation, the 3D reconstruction may be performed using images from the multiple channel data stream of each camera (Camera 1 and Camera 2), where the number of channels may correspond to the number of filter types of filter arrays 104A and 104B. As illustrated in the example of FIG. 3, stereo camera system 300 may further include an image signal processor (ISP) 304, described in more detail below, configured to generate data to reconstruct a 3D multispectral, multi-polarization images using the channels obtained using filter arrays 104A and 104B with differing filter-type combinations.

Each optical camera (e.g., Camera 1) may include an image sensor and lens or lens assembly to collect and focus incoming light onto the focal area of the image sensor. As an example and not by way of limitation, optical cameras Camera 1 and Camera 2 may include a fisheye lens, ultra-wide-angle lens, wide-angle lens, or normal lens to focus light onto the image sensor. Although this disclosure describes and illustrates particular optical cameras having particular image sensors and filter arrays, this disclosure contemplates any suitable optical cameras having any suitable image sensors and filter arrays having any suitable features.

As described in more detail above, the image sensor of Camera 1 may include a filter array 104A with a particular combination of filter types. In particular embodiments, filter array 104A may have a different combination of filter types compared to the combination of filter types of filter array 104B. As an example and not by way of limitation, filter array 104A may have a different color combination compared to the color combination of filter array 104B, as illustrated in the example of FIG. 3. In particular embodiments, filter arrays 104A and 104B may include a pattern of N×N (where N is 2 or more) subsets of areas including a combination of filter types that may include a filter for wavelength 1, wavelength 2, wavelength 3, or wavelength 4.

In particular embodiments, the filter array of Camera 1 may include a wavelength corresponding to a color of interest that is a known color of any object of interest, such as orange for construction cones/signs, yellow for lane dividers or warning signs (e.g., pedestrian or school-zone signs, etc.), a particular shade of blue (e.g., parking or handicap signs, etc.), a particular shade of red (e.g., stop signs or traffic light, etc.), etc. As an example and not by way of limitation, the color of interest of the filter array of Camera 1 may be the range of wavelengths corresponding to the color orange (or any other color of interest). In particular embodiments, filter arrays 104A and 104B may include a referential filter type that has a spatial location in the mosaic that is different between filter arrays 104A and 104B. In this case, a ML algorithm may compensate for the known location offset. In particular embodiments, filter arrays 104A and 104B may include a referential filter type that has a spatial location in the mosaic that is common to both filter arrays 104A and 104B, as illustrated in the example of FIG. 3. As an example and not by way of limitation, for a 2×2 pattern or mosaic, the bottom right-hand corner of the mosaic of 104A and 104B may include a "clear" or visible spectrum filter as the referential filter type. As described in more detail below, data from the photosites corresponding to the visible spectrum filter may be used to establish a correspondence between pixels in two or more cameras with overlapping frustums (e.g., Camera 1 and Camera 2) and generate a multispectral, multi-polarization image that includes composite data of the filter types of filter arrays 104A and 104B. Although this disclosure describes and illustrates filter arrays with a particular referential or common filter-type, this disclosure contemplates any suitable referential or common filter-type, such as for example a particular spectrum (color) or polarization.

Figure 4:
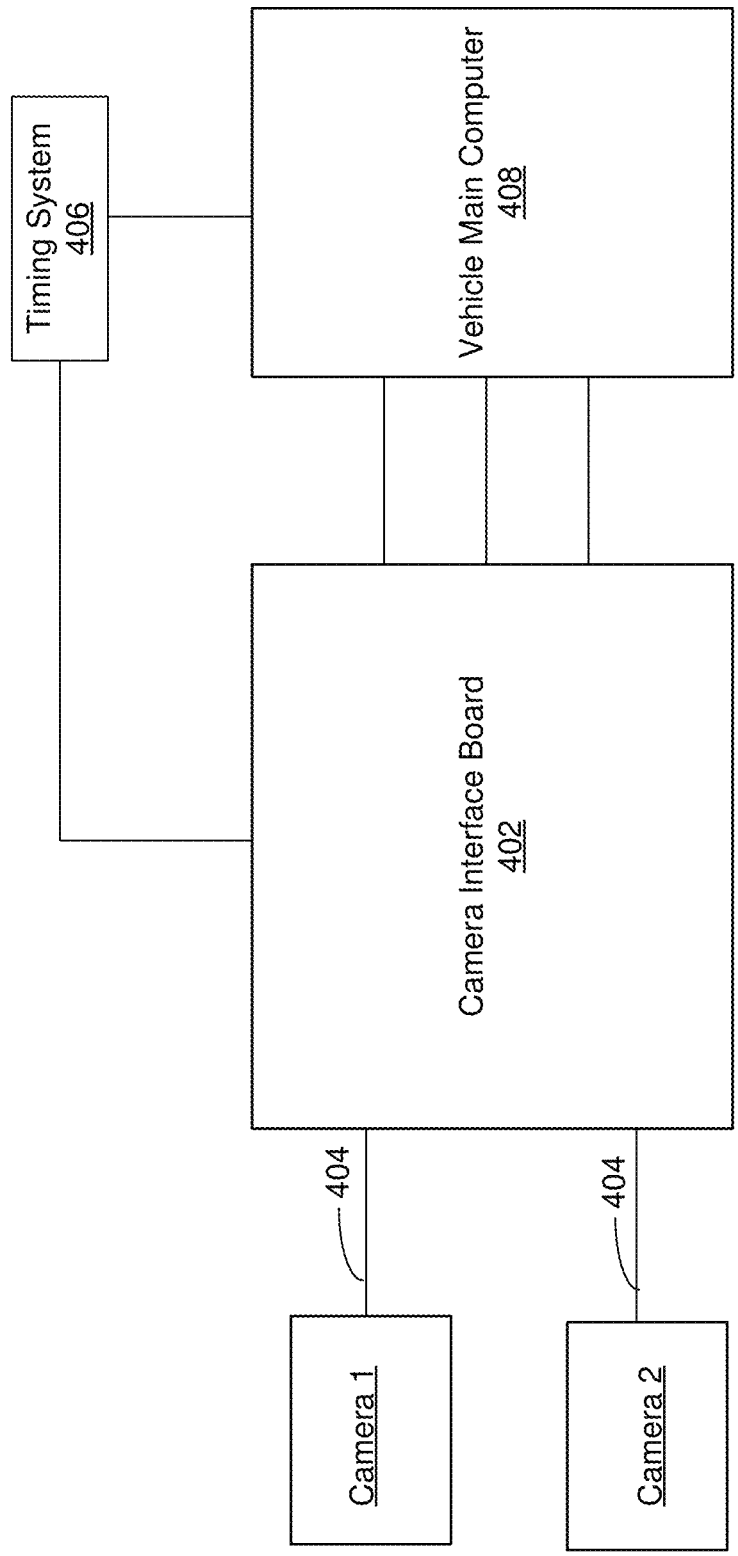
FIG. 4 illustrates an example an example schematic of an automotive camera system.

FIG. 4 illustrates an example schematic of a camera system. As illustrated in the example of FIG. 4, each optical camera (e.g., Camera 1 and Camera 2) may be connected to a camera interface board (CIB) 402 through a respective power over coax (PoC) serial link 404. In particular embodiments, CIB 402 may be mounted inside a vehicle or outside the vehicle (e.g., roof) within a sensor array. Further, CIB 402 may multiplex power, and timing and control (e.g., I$^2$C) data sent to respective optical camera (e.g., Camera 1) and image/video data (e.g., MIPI) received from the respective optical camera (e.g., Camera 1) connected by its serial link (e.g., 404). A timing system 406 that is coupled to CIB 402 provides a synchronization (synch) pulse to Camera 1 and Camera 2 through its respective serial link 404. Further, timing system 406 is coupled to main computer 408 and provides timestamp information of the data that is captured by optical cameras with overlapping frustums. In particular embodiments, main computer 408 of the interfaces with the outside world and controls the overall function of a vehicle. Although this disclosure describes and illustrates a particular camera system having a particular configuration of components, this disclosure contemplates any suitable camera system having any suitable configuration of components.

In particular embodiments, CIB 402 may include an ISP, described in more detail above, that is configured to process the data from the image sensors to generate composite data that combines data from the differing combinations of filter types. In particular embodiments, including features or filter-types of interest to the mosaic of the filter arrays may allow detection of objects without the use of the ISP. In particular embodiments, a machine-learning (ML) algorithm may be able to detect objects having the color of interest and only process the portion of the image containing these objects. As an example and not by way of limitation, an algorithm may be able to process only the portion of an image that includes orange traffic cones. In particular embodiments, objects having the color of interest may be detected without the use of the ISP using data from photosites based on a value of the data (e.g., a signal proportional to the intensity) from these photosites being higher than a pre-determined threshold value. As an example and not by way of limitation, a ML algorithm may be able to detect traffic cones on a roadway by identifying a number of triangular shapes based on the value of the data for these shapes being above the pre-determined threshold value. Furthermore, the ML algorithm may process the full spectrum data corresponding to the area surrounding the detected objects to navigate a vehicle through the work zone.

The ISP may be configured to extrapolate the data corresponding to features or filter types that are not present in each photosite. For example, the ISP may interpolate the data, for a photosite having a red filter, corresponding to blue and green components based on data from neighboring photosites. Furthermore, for pixel of each image captured by multiple cameras, the ISP may be configured to combine data corresponding to all of the channels that are available in every image into a set of composite data or a feature map, as described in more detail below. In particular embodiments, for pixel of each image captured by multiple cameras (e.g., Camera 1 and Camera 2), the ISP may be configured to extrapolate all of the channels that are available in every image, as well as derive values for characteristics that are not directly measurable. As an example and not by way of limitation, the ISP may be configured to estimate the surface normal for each pixel based on data from a filter array with different polarization features. Furthermore, the ISP may estimate the depth of a pixel, velocity associated with a pixel, or estimate an occlusion mask. The occlusion mask for a particular scene provides information of whether a particular pixel in the scene may or may not be visible in the image of other optical cameras capturing at least part of the scene.

Figure 5:
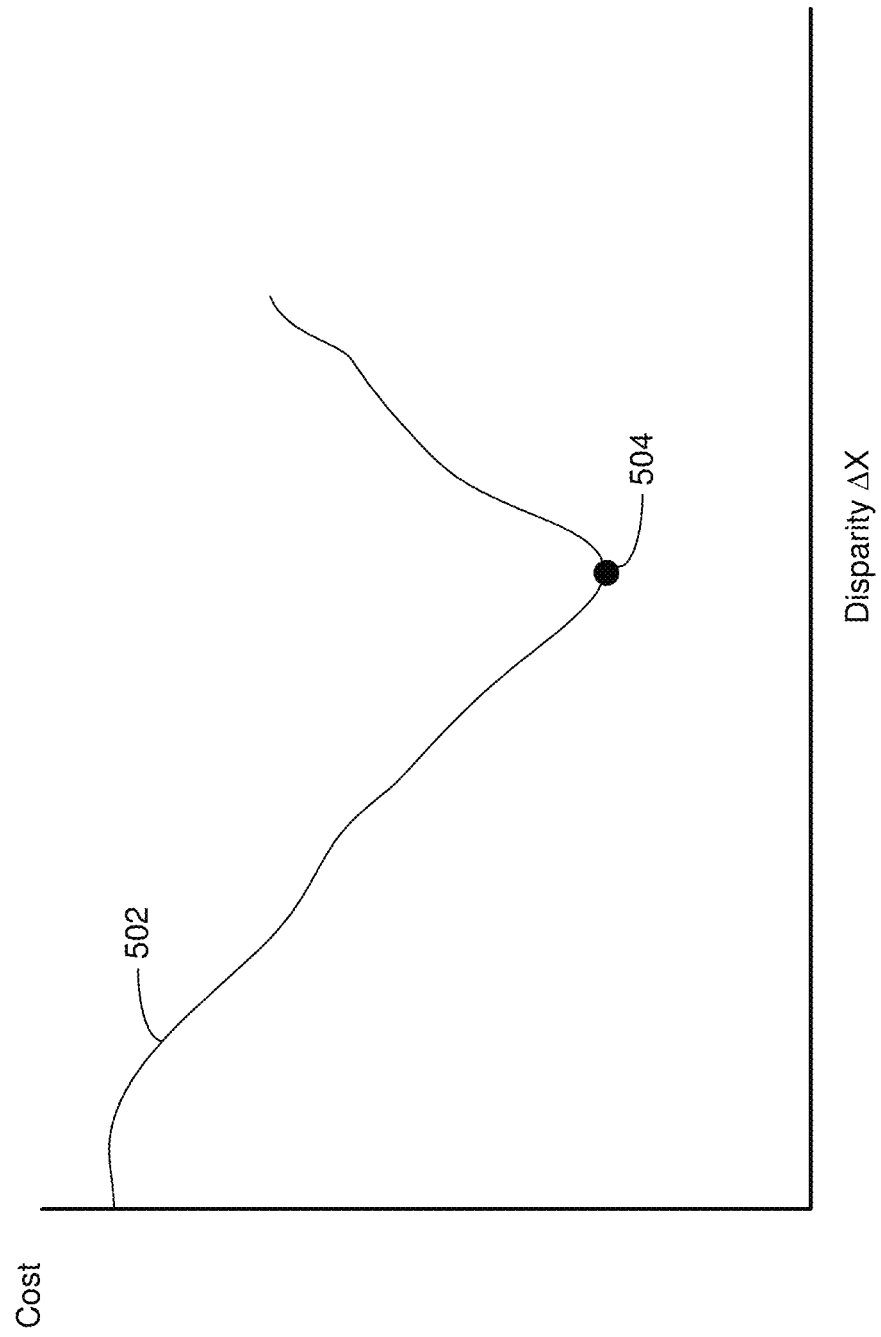
FIG. 5 illustrates an example depth calculation.

FIG. 5 illustrates an example cost calculation. In particular embodiments, the main computer or other computing system may derive values for characteristics that are not directly measurable based on the composite data from the differing filter arrays. As an example and not by way of limitation, a computing system may be configured to estimate a surface normal for each pixel based on data from a filter array with different polarization filter types. Furthermore, the computing system may estimate the depth of a pixel, velocity associated with a pixel, or estimate an occlusion mask. An occlusion mask for a particular scene provides information of whether a particular pixel in the scene may or may not be visible in the image of other optical cameras capturing at least part of the scene.

A depth map is an image or image channel that contains information relating to the distance of each pixel corresponding to the surfaces of objects in the field of view (FOV). In particular embodiments, the depth information may be determined by calculating a cost volume for the images. The cost volume is a 3D (e.g., x, y, and disparity $\Delta X$) look-up table with values of the cost at every pixel. The cost volume is a calculation of the cost, for a single image, that is a function of x, y, and disparity ($\Delta X$). The cost(x, y, $\Delta X$) may also be an indicator of how well the pixel at x, y in the first image matches up with pixels in several other images (the position of the pixel or patch of pixels to compare in the other images are functions of disparity). The cost may be calculated based on the data of the pixels (e.g., intensity). In particular embodiments, the cost for each value of disparity may be calculated as a sum of absolute difference of the pixel data. In particular embodiments, the cost volume may be calculated based on the data captured by photosites of the image sensor corresponding to a visible spectrum pixel since the data from these pixels are unaffected by filtering of the filter array. In particular embodiments, cost aggregation that selects a specific disparity value for at each pixel is performed. As illustrated in the example of FIG. 5, a cost 502 may be calculated as a function of disparity $\Delta X$. In particular embodiments, the "correct" value of for the disparity $\Delta X$ may be the $\Delta X$ value with the lowest cost 504. In some instances, there are several values of disparity $\Delta X$ with approximately the same cost 502. In particular embodiments, the best value for disparity $\Delta X$ may be determined by incorporating the cost volume into a larger system that solves for the disparity $\Delta X$ at every pixel so that the cost volume minimizes cost for pixel similarity, and in particular embodiments, may include other cost terms that measure global smoothness of the solution. In other words, for a smooth 3D surface, it is expected the disparities $\Delta X$ of neighboring pixels to be similar.

Determining the value of $\Delta X$ provides information of the spatial correspondence between pixels in the images capturing a scene and that are used for multi-view stereo reconstruction of the external environment. In particular embodiments, the depth information may be used to determine the spatial correlation between pixels in corresponding images, and values for features that are captured by different filter arrays or cameras (e.g., 2 or more) may be assigned to each pixel of a full-resolution, multispectral, multi-polarization image. In other words, a red value captured by a particular photosite on a first image sensor and an intensity value captured by the corresponding photosite with a particular polarization on a second image sensor may be assigned to a pixel of the multispectral, multi-polarization image. As an example and not by way of limitation, a half-resolution image may be generated by combining the data from the N×N mosaic of the filter array into a single pixel, where the single pixel includes the data from all of the features of the N×N mosaic. As an example and not by way of limitation, the features of a filter array of a first camera may include a N×N spectrum combination of visible spectrum, red, blue, and orange. A second camera may have a filter array with N×N mosaic of features corresponding to visible spectrum, red, blue, and green. Once the depth is estimated in both images, a half-resolution image may be generated that includes pixels with data captured for visible spectrum, red, blue, green, and orange filter types.

In particular embodiments, after the depth of a pixel in a first image of scene is estimated, then the ISP or ML algorithm is able to determine the location the corresponding pixel appears in a second image or is able to determine that the second camera is unable to capture the pixel based on an occlusion mask. In other words, estimating depth assists with interpolating data from corresponding pixels or demosaicing. Although this disclosure describes and illustrates filter arrays with particular feature combinations, this disclosure contemplates any suitable filter array with any suitable combination of features, such as for example colors, polarization, or thermal. These features may provide information to calculate a depth map of the scene, which may then be used to perform demosaicing of the data or interpolation of features not directly measured by a particular pixel.

In particular embodiments, the simultaneous capture of data from incident light filtered using different polarization allows for more accurate 3D reconstruction. As an example and not by way of limitation, analyzing data with different polarization may improve surface normal estimation, but purely physics-based models leave ambiguity which may be resolved using an ML algorithm. The image data from each type of polarization (e.g., vertical or 45°) provides different information that may then be used to determine the surface normal. In particular embodiments, the raw polarized data may be directly applied to a ML algorithm to extract the surface normal and improve depth mapping. Acquiring image data through different polarizations allows for more accurate depth mapping which helps with detecting featureless objects in the frustum of optical cameras. For 3D reconstruction of data from multiple cameras, identifying a particular location in the frustum of a first optical camera and the corresponding location in the frustum of other optical cameras, may be challenging, especially for featureless objects (e.g., a white wall) that lack distinguishing features to assist with the identifying a location on the featureless object. Image data captured through filters with different polarization may be used to obtain an estimate of a surface normal for use as a constraint to reconstruct the 3D environment.

In particular embodiments, polarizing filters may be integrated with filter arrays of one or more optical cameras. As an example and not by way of limitation, each filter within each N×N subsets of filters may have a different polarization. As an example and not by way of limitation, a first filter type may be vertical polarization or 90° a second filter type may be horizontal polarization or 0°, and a third filter type may be 45° polarization. Using polarized filters may allow the simultaneous acquisition of data from incident light filtered using different polarization, which is useful for capturing video or scenes where objects in the scene are moving. In contrast, multi-polarization data may be captured by a single camera with an adjustable polarization filter, which is rotated in between successive images, but in this case, it is not possible to capture video. The image data from each type of polarization (e.g., vertical, horizontal, or 45°) provides different information that may be used to determine the surface normal. In particular embodiments, surface normals may be estimated using the data from different polarization filter types. The surface normals may be used to refine the estimate of depth to generate the depth map, described in more detail above, or as an input to a ML algorithm for object detection.

In particular embodiments, a tensor, described in more detail below, generated by the ISP may be in an input to a ML algorithm for estimating class distributions. In particular embodiments, the tensor generated by the ISP with the features of the filter array may be used for object classification, which is a prediction a pixel or group of pixels corresponds to a particular class of objects (e.g., a car or tree) in the scene. As an example and not by way of limitation, the ISP may generate a tensor with indices that include values of either true/false (e.g., 0 or 1) or probabilities that the group of pixels corresponds the particular class of objects. In particular embodiments, the tensor with composite data may also be used to perform localization/detection, which provides not only the classes of objects in a scene, but also additional information regarding the spatial location of those classes. In particular embodiments, the tensor with composite data may also be used to semantic segmentation, which infers labels for every pixel, such that each pixel may be labeled with the particular class of its enclosing object or region.

A tensor has an associated rank that is corresponds to a number of indices of the tensor. For example, a rank $0$ tensor is a scalar, rank $1$ tensor is a vector, a rank $2$ tensor is a 2D array. In particular embodiments, the ISP may generate a tensor that includes spatial coordinates (e.g., x and y coordinates) and one or more channels of data, where the third index C corresponding to the channel may have multiple values. As an example and not by way of limitation, C=0 may correspond to red, C=1 may correspond to green, C=2 may correspond to blue, C=3 may correspond to depth, or C=4 may correspond to the x-component of the surface normal. In particular embodiments, a ML algorithm may perform convolutions on the tensor with the composite data and generate new tensors that includes additional features or a feature map. The convolution may take a tensor with one shape or rank as the input and typically outputs a tensor where the rank is the same but with different shape or number in a filling index. As an example and not by way of limitation, after the convolution, the tensor may include data corresponding to red, green, blue, other colors of interest, thermal, polarization, normal, depth, velocity, or other suitable features.

Embodiments described herein provide benefits for 3D reconstruction and object detection. In particular embodiments, the tensors, generated by the ISP, that includes composite data of the features of differing filter arrays may be directly applied to a ML algorithm. As an example and not by way of limitation, data from these photosites may not require processing by the ISP to extrapolate data corresponding to colors outside of primary colors of a Bayer color filter (e.g., red, green, and blue). In particular embodiments, a ML algorithm may detect objects based on the composite data matching a spectrum signature of a particular object. As an example and not by way of limitation, a traffic cone in a scene may be detected based on the composite data of the tensor matching the spectrum signature of a traffic cone.

Figure 6:
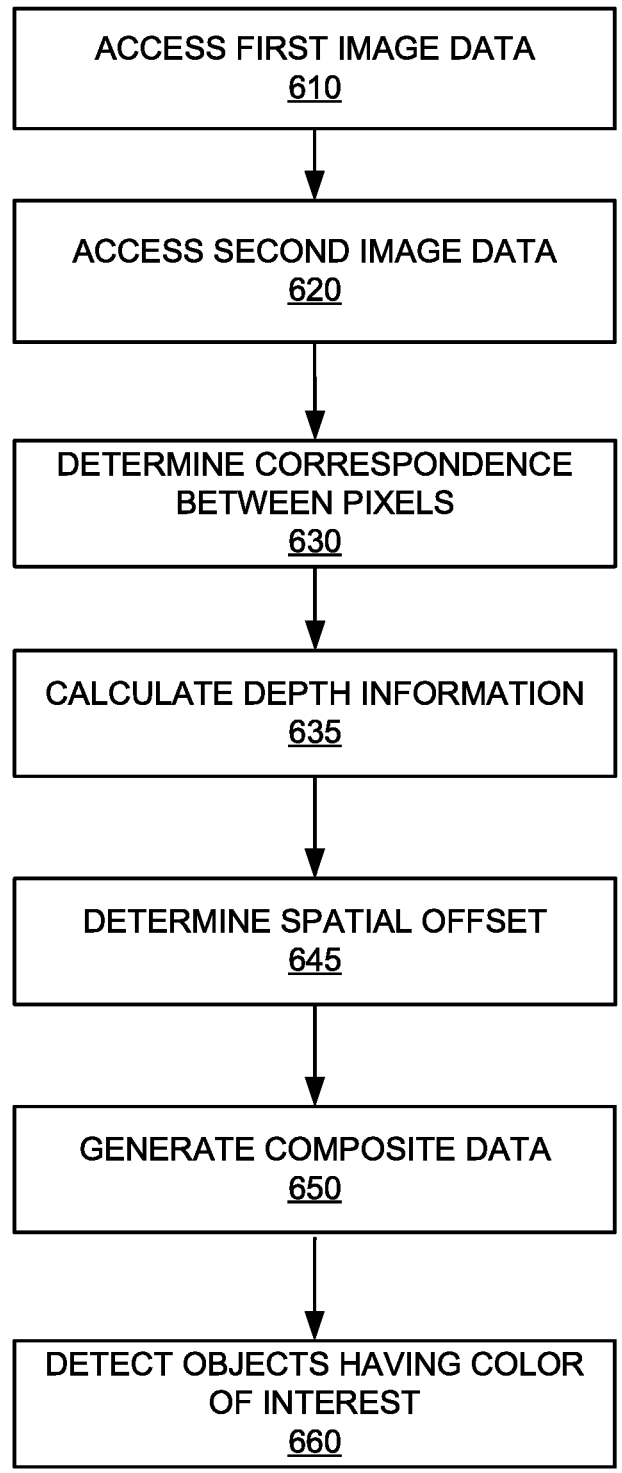
FIG. 6 illustrates an example method for detecting an object of interest.

FIG. 6 illustrates an example method for detecting an object of interest. The method 600 may begin at step 610, a computing system may access first image data generated by a first image sensor having a first filter array that has a first filter pattern. In particular embodiments, the first filter pattern includes a first filter type corresponding to a color of interest (e.g., orange) and a second filter type. As an example and not by way of limitation, the second filter type may be a clear filter. At step 620, the computing system may access second image data generated by a second image sensor having a second filter array that has a second filter pattern different from the first filter pattern. In particular embodiments, the second filter pattern includes the second filter type. Furthermore, the second filter pattern may include a third and fourth filter type that each correspond to a primary color.

At step 630, the computing system determines a correspondence between one or more first pixels of the first image data and one or more second pixels of the second image data based on a portion of the first image data associated with the second filter type and a portion of the second image data associated with the second filter type. In particular embodiments, the portion of the first image data and the second image data is from a clear filter of the filter patterns. At step 635, the computing system calculates depth information of the first image data and the second image data based on data of the second filter type. At step 645, the computing system determines a spatial offset between the first image data and the second image data. In particular embodiments, the depth information of the first and second image data may be determined through the calculated spatial offset.

At step 650, the computing system generates, based on the correspondence, composite data using the first image data and the second image data. In particular embodiments, the composite image data is a combination of the data from the filter types of the first filter pattern and the filter types of the second filter pattern. At step 660, the computing system detects, based on the composite data, one or more objects having the color of interest. In particular embodiments, a ML algorithm detects the objects based on a spectrum signature included in the composite data.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for detecting an object of interest including the particular steps of the method of FIG. 6, this disclosure contemplates any suitable method for detecting an object of interest including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
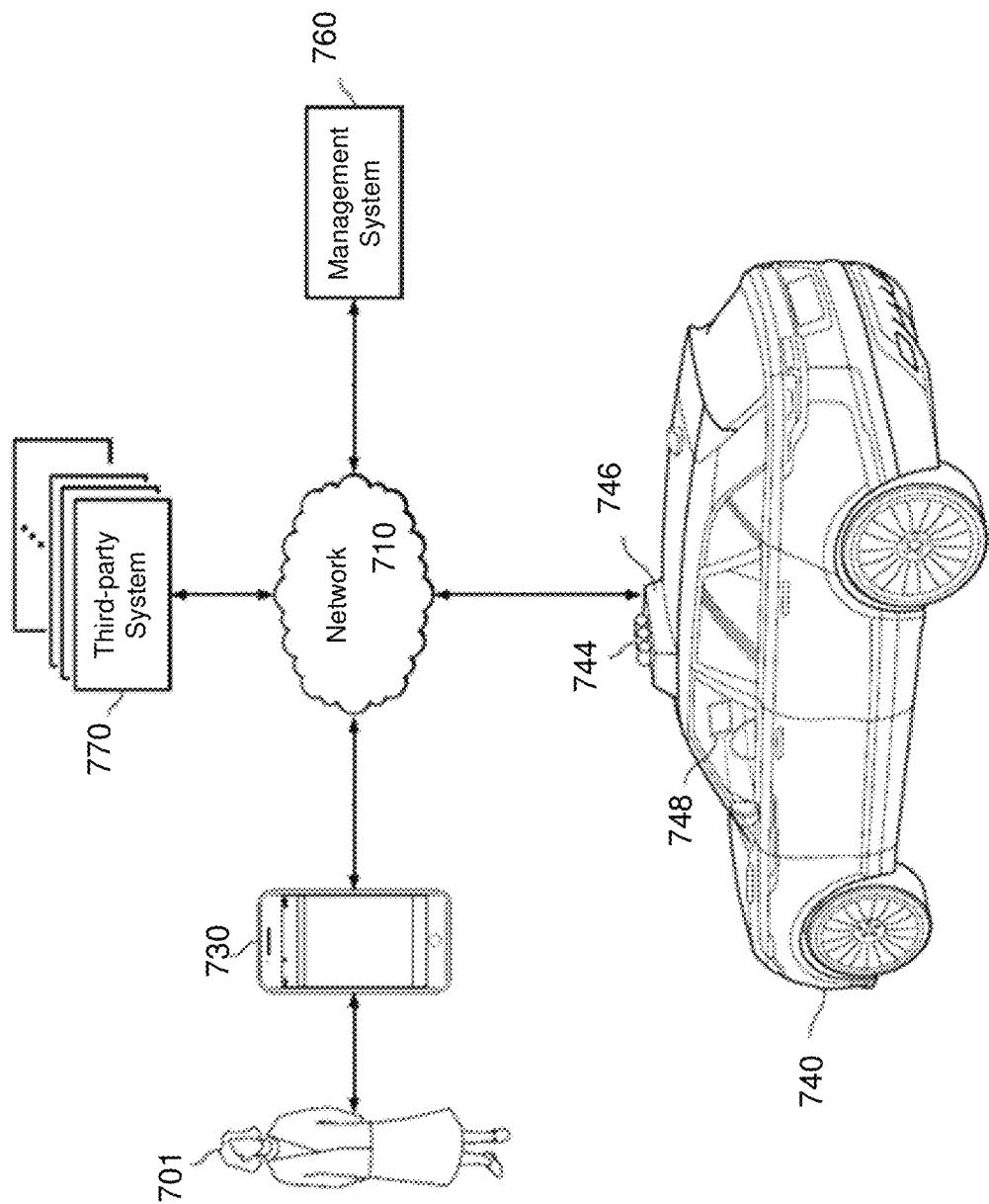
FIG. 7 illustrates an example block diagram of a transportation management environment.

The embodiments described herein are applicable in a variety of contexts and can benefit any system or method that utilizes information derived from images, such as imaging and perception systems used in transportation vehicles (autonomous, manually, or semi-autonomously operated), robotic systems, and/or any suitable applications that benefit from accurate characterization and perception of surroundings. As an example and not by way of limitation, FIG. 7 illustrates an example block diagram of a transportation management environment that may use a multispectral, multi-polarization imaging system. In particular embodiments, the environment may include various computing entities, such as a user computing device 730 of a user 701 (e.g., a ride provider or requestor), a transportation management system 760, an autonomous vehicle 740, and one or more third-party system 770. The computing entities may be communicatively connected over any suitable network 710. As an example and not by way of limitation, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 7 illustrates a single user device 730, a single transportation management system 760, a vehicle 740, a plurality of third-party systems 770, and a single network 710, this disclosure contemplates any suitable number of each of these entities. As an example and not by way of limitation, the network environment may include multiple users 701, user devices 730, transportation management systems 760, autonomous-vehicles 740, third-party systems 770, and networks 710.

In particular embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 760 may include one or more data stores. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases.

In particular embodiments, vehicle 740 may be an autonomous vehicle and equipped with an array of sensors 744, a navigation system 746, and a ride-service computing device 748. In particular embodiments, a fleet of autonomous vehicles 740 may be managed by the transportation management system 760. The fleet of autonomous vehicles 740, in whole or in part, may be owned by the entity associated with the transportation management system 760, or they may be owned by a third-party entity relative to the transportation management system 760. In either case, the transportation management system 760 may control the operations of the autonomous vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In particular embodiments, vehicles 740 may receive data from and transmit data to the transportation management system 760 and the third-party system 770. Example of received data may include, e.g., instructions, new software or software updates, maps, 3D models, trained or untrained machine-learning models, location information (e.g., location of the ride requestor, the autonomous vehicle 740 itself, other autonomous vehicles 740, and target destinations such as service centers), navigation information, traffic information, weather information, entertainment content (e.g., music, video, and news) ride requestor information, ride information, and any other suitable information. Examples of data transmitted from the autonomous vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 740, passengers may send/receive data to the transportation management system 760 and/or third-party system 770), and any other suitable data.

In particular embodiments, an autonomous vehicle 740 may obtain and process sensor/telemetry data. Such data may be captured by any suitable sensors. For example, the vehicle 740 may have a LiDAR sensor array of multiple LiDAR transceivers that are configured to rotate 360°, emitting pulsed laser light and measuring the reflected light from objects surrounding vehicle 740. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 740. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In particular embodiments, the vehicle may be equipped with stereo vision for, e.g., spotting hazards such as pedestrians or tree branches on the road. As another example, the vehicle 740 may have radars for, e.g., detecting other vehicles and/or hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 740 may build a 3D model of its surrounding based on data from its LiDAR, radar, sonar, and cameras, along with a pre-generated map obtained from the transportation management system 760 or the third-party system 770. Although sensors 744 appear in a particular location on autonomous vehicle 740 in FIG. 7, sensors 744 may be located in any suitable location in or on autonomous vehicle 740. Example locations for sensors include the front and rear bumpers, the doors, the front windshield, on the side panel, or any other suitable location.

In particular embodiments, the autonomous vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest.

Figure 8:
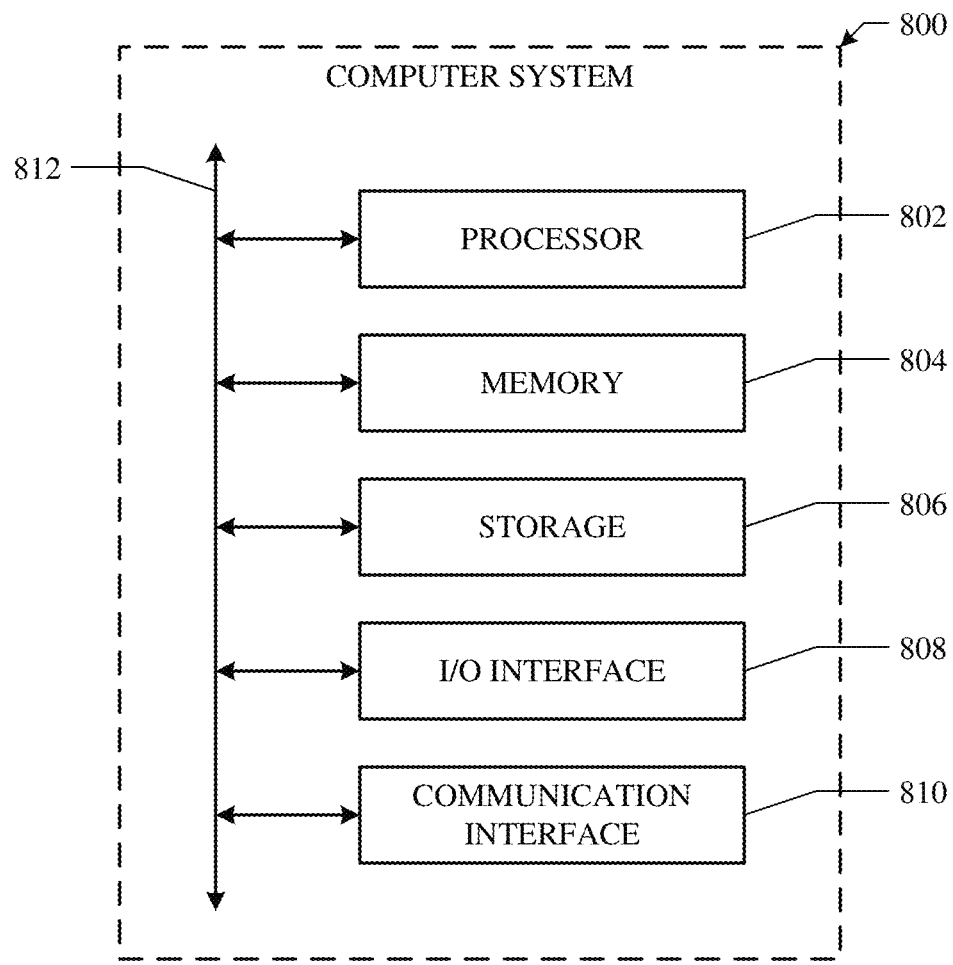
FIG. 8 illustrates an example of a computing system.

FIG. 8 illustrates an example computer system. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing first image data generated by a first image sensor having a first filter array that has a first filter pattern, wherein the first filter pattern comprises a first plurality of filter types, one of which is a first filter type corresponding to a spectrum of interest;
   accessing second image data generated by a second image sensor having a second filter array that has a second filter pattern different from the first filter pattern, wherein the second filter pattern comprises a second plurality of filter types, wherein the second plurality of filter types and the first plurality of filter types have at least one filter type in common;
   determining a correspondence between one or more first pixels of the first image data and one or more second pixels of the second image data based on a portion of the first image data associated with the at least one filter type in common and a portion of the second image data associated with the at least one filter type in common;
   generating a tensor comprising composite data and spatial information using the first image data, the second image data, and the correspondence between the first image data and the second image data, wherein the composite data comprises data associated with the first filter type corresponding to the spectrum of interest; and
   detecting, based at least on the composite data of the tensor, one or more objects corresponding to the spectrum of interest.

2. The method of claim 1, further comprising calculating depth information of the first image data and the second image data based on data of a plurality of polarization filters associated with the first image data or the second image data.

3. The method of claim 2, wherein calculating the depth information comprises determining a spatial offset between a pixel of the first image data and a corresponding pixel of the second image data based on the portion of the first image data associated with the at least one filter type in common and the portion of the second image data associated with the at least one filter type in common.

4. The method of claim 1, wherein detecting the one or more objects comprises comparing the data associated with the first filter type corresponding to the spectrum of interest with stored data of objects having the spectrum of interest.

5. The method of claim 1, wherein relative locations of the at least one filter type in common in the first filter pattern and the second filter pattern are the same.

6. The method of claim 1, wherein the first filter type corresponding to the spectrum of interest is absent from the second filter pattern.

7. The method of claim 1, further comprising:
accessing third image data, wherein generating the composite data further comprises using one or more image data generated by one or more additional image sensors, wherein at least one of the one or more additional sensors has a third filter array that has a third filter pattern different from the first filter pattern or the second filter pattern.

8. The method of claim 1, wherein the detecting comprises comparing, by a machine-learning algorithm, the composite data with stored composite data of one or more objects of interest.

9. The method of claim 1, wherein the spatial information comprises spatial coordinates associated with the composite data.

10. One or more computer-readable non-transitory storage media embodying software that is operable when executed to cause one or more processors to perform operations comprising:
accessing first image data generated by a first image sensor having a first filter array that has a first filter pattern, wherein the first filter pattern comprises a first plurality of filter types, one of which is a first filter type corresponding to a spectrum of interest;
accessing second image data generated by a second image sensor having a second filter array that has a second filter pattern different from the first filter pattern, wherein the second filter pattern comprises a second plurality of filter types, wherein the second plurality of filter types and the first plurality of filter types have at least one filter type in common;
determining a correspondence between one or more first pixels of the first image data and one or more second pixels of the second image data based on a portion of the first image data associated with the at least one filter type in common and a portion of the second image data associated with the at least one filter type in common;
generating a tensor comprising composite data and spatial information using the first image data, the second image data, and the correspondence between the first image data and the second image data, wherein the composite data comprises data associated with the first filter type corresponding to the spectrum of interest; and
detecting, based at least on the composite data of the tensor, one or more objects corresponding to the spectrum of interest.

11. The media of claim 10, wherein the software is further operable to calculate depth information of the first image data and the second image data based on data of a plurality of polarization filters associated with the first image data or the second image data.

12. The media of claim 11, wherein the software is further operable to determine a spatial offset between a pixel of the first image data and a corresponding pixel of the second image data based on the portion of the first image data associated with the at least one filter type in common and the portion of the second image data associated with the at least one filter type in common.

13. The media of claim 10, wherein the software is further operable to compare the data associated with the first filter type corresponding to the spectrum of interest with stored data of objects having the spectrum of interest.

14. The media of claim 10, wherein relative locations of the filter type in common in the first filter pattern and the second filter pattern are the same.

15. The media of claim 10, wherein the first filter type corresponding to the spectrum of interest is absent from the second filter pattern.

16. A computing system comprising:
one or more processors; and
one or more computer-readable non-transitory storage media coupled to one or more of the processors, the one or more computer-readable non-transitory storage media comprising instructions operable when executed by one or more of the processors to cause the computing system to perform operations comprising:
accessing first image data generated by a first image sensor having a first filter array that has a first filter pattern, wherein the first filter pattern comprises a first plurality of filter types, one of which is a first filter type corresponding to a spectrum of interest;
accessing second image data generated by a second image sensor having a second filter array that has a second filter pattern different from the first filter pattern, wherein the second filter pattern comprises a second plurality of filter types, wherein the second plurality of filter types and the first plurality of filter types have at least one filter type in common;
determining a correspondence between one or more first pixels of the first image data and one or more second pixels of the second image data generated by the one or more additional image sensors based on a portion of the first image data associated with the at least one filter type in common and a portion of the second image data associated with the at least one filter type in common;
generating a tensor comprising composite data and spatial information using the first image data the second image data, and the correspondence between the first image data and the second image data, wherein the composite data comprises data associated with the first filter type corresponding to the spectrum of interest; and
detecting, based at least on the composite data of the tensor, one or more objects corresponding to the spectrum of interest.

17. The system of claim 16, wherein the processors are further operable to calculate depth information of the first image data and the second image data generated by the one or more additional sensors based on data of a plurality of polarization filters associated with the first image data or the second image data.

18. The system of claim 17, wherein the processors are further operable to determine a spatial offset between a pixel of the first image data and a corresponding pixel of the second image data generated by the one or more additional sensors based on the portion of the first image data associated with the at least one filter type in common and the portion of the second image data associated with the at least one filter type in common.

19. The system of claim 16, wherein the processors are further operable to compare the data associated with the first filter type corresponding to the spectrum of interest with stored data of objects having the spectrum of interest.

20. The system of claim 16, wherein relative locations of the filter type in common in the first filter pattern and the second filter pattern are the same.

* * * * *